(12) United States Patent
Boegelsack et al.

(10) Patent No.: US 7,058,394 B2
(45) Date of Patent: Jun. 6, 2006

(54) METHOD AND SYSTEM FOR COMMUNICATION WITH THE INTERNET

(75) Inventors: Martin Boegelsack, Bergfelde (DE); Guenther Zurek-Terhardt, Schöneiche (DE)

(73) Assignee: T-Mobile Deutschland GmbH, Bonn (DE)

( * ) Notice: Subject to any disclaimer, the term of this patent is extended or adjusted under 35 U.S.C. 154(b) by 39 days.

(21) Appl. No.: 10/363,950

(22) PCT Filed: Aug. 31, 2001

(86) PCT No.: PCT/EP01/10061

§ 371 (c)(1),
(2), (4) Date: Jul. 24, 2003

(87) PCT Pub. No.: WO02/21738

PCT Pub. Date: Mar. 14, 2002

(65) Prior Publication Data

US 2004/0014465 A1   Jan. 22, 2004

(30) Foreign Application Priority Data

Sep. 6, 2000   (DE) .................. 100 44 161

(51) Int. Cl.
*H04M 3/42* (2006.01)
(52) U.S. Cl. .................. 455/414.2; 455/414.3; 709/217
(58) Field of Classification Search .. 455/414.1–414.3, 455/414.4, 466, 456.2, 517, 556.1, 557, 556; 370/310–310.1, 352–355, 429, 428, 466, 370/467; 709/217, 227, 229, 231, 225
See application file for complete search history.

(56) References Cited

U.S. PATENT DOCUMENTS

| | | | | | |
|---|---|---|---|---|---|
| 5,915,094 | A | * | 6/1999 | Kouloheris et al. | 709/219 |
| 5,935,207 | A | * | 8/1999 | Logue et al. | 709/219 |
| 5,991,306 | A | * | 11/1999 | Burns et al. | 370/429 |
| 6,021,433 | A | * | 2/2000 | Payne et al. | 709/219 |
| 6,058,422 | A | * | 5/2000 | Ayanoglu et al. | 709/226 |
| 6,122,263 | A | * | 9/2000 | Dahlin et al. | 370/329 |
| 6,289,389 | B1 | * | 9/2001 | Kikinis | 709/239 |
| 6,351,761 | B1 | * | 2/2002 | Cantone et al. | 709/202 |
| 6,470,189 | B1 | * | 10/2002 | Hill et al. | 455/517 |
| 6,477,704 | B1 | * | 11/2002 | Cremia | 725/35 |
| 6,721,794 | B1 | * | 4/2004 | Taylor et al. | 709/231 |
| 6,742,038 | B1 | * | 5/2004 | Britt, Jr. | 709/228 |
| 6,810,413 | B1 | * | 10/2004 | Rajakarunanayake et al. | 709/203 |
| 2002/0178236 | A1 | * | 11/2002 | Patel et al. | 709/218 |
| 2003/0154487 | A1 | * | 8/2003 | Tsumura | 725/93 |

FOREIGN PATENT DOCUMENTS

| | | |
|---|---|---|
| EP | 00 300 880.2 | 2/2000 |
| GB | 2 313 981 A | 12/1997 |
| WO | PCT/US96/03669 | 3/1996 |
| WO | PCT/SE98/01034 | 5/1998 |
| WO | PCT/US98/19881 | 9/1998 |

\* cited by examiner

*Primary Examiner*—Charles N. Appiah
(74) *Attorney, Agent, or Firm*—Myron Greenspan, Esq.; Lackenbach Siegel, LLP

(57) ABSTRACT

The invention relates to a method and a system for communicating with the Internet, whereby at least one communication network and one radio system is used for a connection between a terminal and the Internet. The radio system allows the transmission of selected information available on the Internet. On the user side, a terminal is provided which comprises a communication device for communicating with the Internet via a communication network and devices for receiving and processing the Internet information transmitted by the radio system.

9 Claims, 1 Drawing Sheet

METHOD AND SYSTEM FOR COMMUNICATION WITH THE INTERNET

Figure 1:
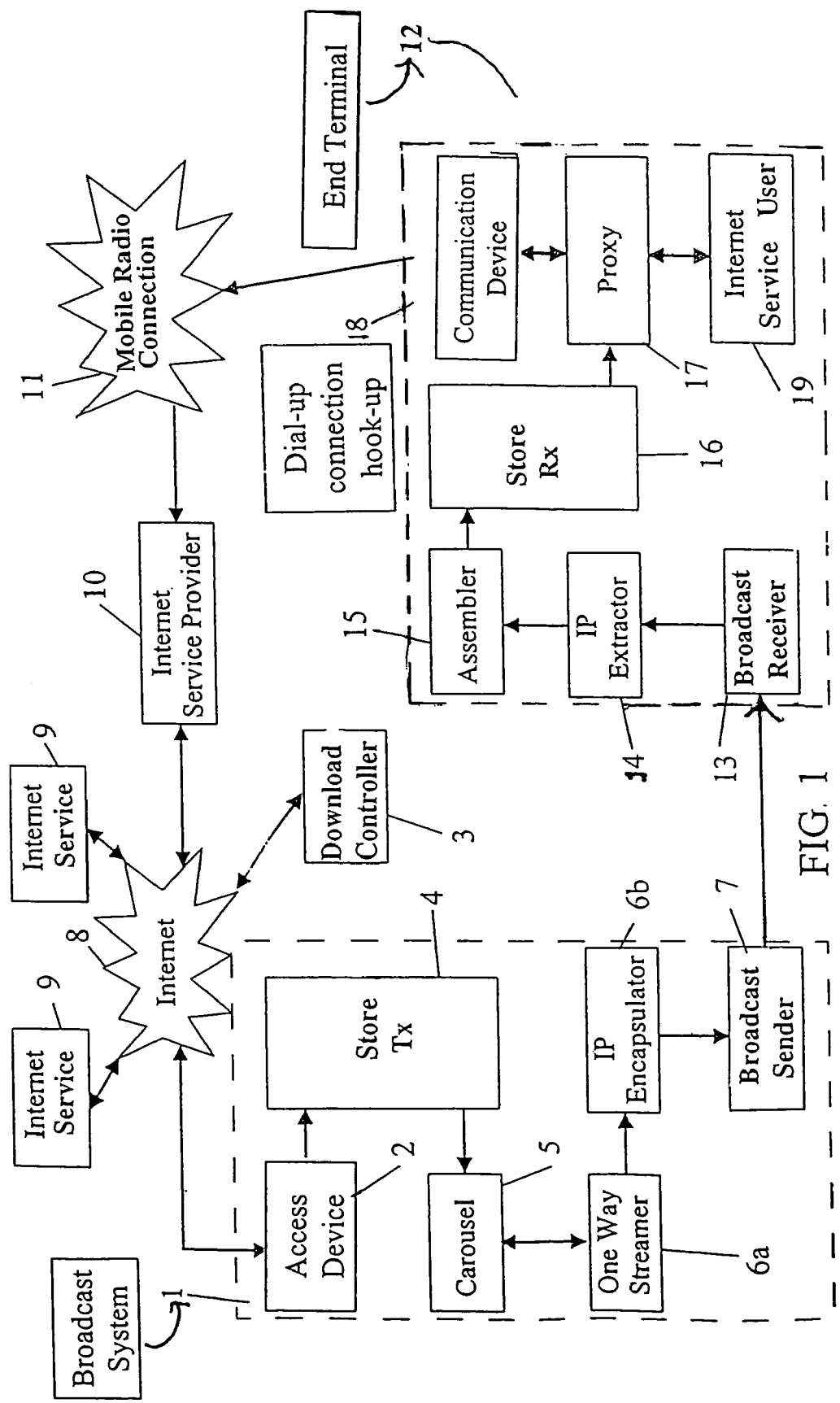

The invention relates to a method and a system for the communication with the Internet according to the preamble of the independent patent claims.

It is known to establish a connection to the Internet by means of a terminal device, for example a personal computer or a mobile radio terminal utilizing a communication network, for example land-line or mobile radio network. The connection via conventional communication networks, however, permits only a relatively low data rate such that duration and costs for data transfer are often very high.

In this case a remedy is provided by an Internet connection via satellite, which, while it permits high data rates in downloading, it is correspondingly expensive.

The task of the invention comprises proposing a method and a system for communicating with the Internet, which at an increased effective data rate can be realized and utilized cost-effectively for the provider as well as also the end user.

The solution of the task is accomplished through the characteristics of the independent patent claims.

Advantageous further developments and embodiments of the invention are subject matter of the dependent patent claims.

According to the invention at least one communication network and one broadcast system are employed for a connection between an end terminal and the Internet, where via the broadcast system selected information made available in the Internet is transmitted, and on the user side, an end terminal is available which includes communication devices for the communication with the Internet via a communication network and devices for receiving the Internet information transmitted by the broadcast system.

With the described system it is possible to obtain random access to all resources available on the Internet. This random access, realized across point-to-point connection of the communication network, is supplemented by the simultaneous distribution of data over the broadcast system. Frequently required information, or information to which access is to be completed rapidly, are preferably sent simultaneously to a group of users via the broadcast system. Through this combination according to the invention, the access to information made available on the Internet is considerably accelerated. This acceleration is attained through the combination of the advantages of a dial-up connection in the case of the communication network with a direction to and from with those of a broadcast system in the form of a point-to-multipoint connection.

The system utilizes the capability of transmitting the IP (Internet Protocol) protocol in the radio signal. This capability of transmitting the Internet Protocol is defined for the transmission protocol MPEG 2 (basis for DVB) and is denoted as multiprotocol encapsulation (EN 301 192 DVB Specification for data broadcasting, ISO/IEC 13819-6 Extensions for DSM-CC). For the transmission method DAB, a standardization (ETSI TS 101 759 DAB Data Broadcasting) is available for the transmission of the IP Protocol. For analog broadcast systems are also available some proposals for the transmission of the Internet protocol.

The broadcast systems offer in particular the advantage of being able to make available with a point to multipoint connection (Multicast) the data to be distributed simultaneously to a number of receivers not restricted by the bandwidth. Furthermore, the transmission of IP data can be optimized through nearly any desired structuring of the DAB/DVB broadcast cells.

The system offers a number of advantages for the receiver and the transmitter of the data:

The system considerably increases the effective data rate of Internet services. Dial-up connections frequently do not offer the transmission capacity desired by the receiver, in particular when using mobile radio connections.

The costs of the transmission of data on the point-to-point dial-up connection between the receiver and the Internet depend on the duration of the connection or the quantity of data transmitted. Due to the simultaneous transmission of data with the point-to-multipoint connection to many receivers, the costs for one receiver can be considerably reduced.

Loading of the server/networks through frequently requested Internet services can be considerably reduced through the simultaneous transmission via broadcast.

A desired Internet service can be specifically made available the a user. The improved access time to this service offers a further advantage.

In the following a feasible embodiment example of the invention will be explained in conjunction with FIG. 1. Based on the drawing and the following description, further characteristics and advantages of the invention will become evident.

The system described in the example according to FIG. 1 employs a broadcast system 1, which permits transmission of video or audio data streams and digital data streams. The broadcast system 1 can be laid out for the transmission of audio streams, for example DAB (Digital Audio Broadcast) or the analog method and/or for the transmission of video and audio streams the DVB (Digital Video Broadcast). Via the broadcast system 1 selected Internet information is broadcast which can be received by an end terminal 12.

In addition, in the example a mobile communication network 11, i.e. a mobile radio connection, is employed for the direct access of the end terminal 12 to the Internet 8. By mobile radio connections are understood dial-up connections via a radio system. Via this dial-up connection a connection to the Internet is established. This connection is conventionally realized via an Internet access instance 10 (Internet Service Provider (ISP)). This dial-up connection forms a point-to-point connection between the ISP 10 and the user 19 of the described system. Via this Internet access subsequently a point-to-point connection is established with the provider of a desired service 9 in the Internet 8.

As already stated before, the Internet 8 permits access to data services 9 (Internet Service). The Internet services 9 utilize the protocols defined in the Internet, for example the Hypertext Transfer Protocol (HTTP), in order to make available information to a group of Internet users.

For access to the Internet 8 in general the Internet Service Provider 10 (ISP) is necessary, which realizes the Internet access and is disposed between the dial-up connection established via the mobile radio network 11 and the Internet 8, and the mobile radio dial-up connection 11 via the ISP 10 makes possible for the user via his communication device 18 the mobile and random access to the Internet 8 with a channel to and from.

For realizing the method according to the invention the broadcast system 1 comprises an Internet access device 2, which obtains the necessary data from the Internet 8. The access device 2 is preferably connected over a data connection of high transmission capacity with the Internet 8. The data downloaded from the Internet are stored in a storage device 4 (Store Tx).

An access control device 3 controls the behavior of the access device 2 as a function of various factors, such as for example frequently requested Internet services. The access control device 3 receives messages from Internet Services 9 and takes these into consideration in the control of the access unit 2. The Internet services 9 can hereby for example activate the simultaneous sending of data via the broadcast system. Furthermore, a time control of the activity of the radio system is possible via it.

A data provision device 5 (carousel) cyclically accesses the data stored in the storage device 4. It makes these data available to an interface device 6a via a bidirectional connection.

The Internet data are set into the provision device 5 according to the transmission frequency. The setting frequency is dynamically adapted to the requirements. Thereby results a relief of the waiting queue condition in the provision device 5 and a shortening of the waiting time for the user.

A device 6a (one-way streamer) as a part of the interface unit carries out a conversion between the bidirectional input data stream from the provision device and the unidirectional output data stream to the broadcast transmitter. In addition, it provides the unidirectional data flow with a protocol ensuring the unidirectional transmission.

An IP encapsulator 6a as a part of the interface device generates from the IP data stream supplied by the provision device 5 a data stream according to the employed radio system or inserts this IP data steam into an existing radio signal.

Via the broadcast transmitter 7 the radio signals containing Internet information are broadcast for example in the DAB or DVB-T format.

At the side of the end terminal 12 a broadcast receiver 13 is available, which receives the broadcast Internet information.

An interface device 14 (IP extractor) filters from the broadcast signal the IP data stream and makes the IP data available to succeeding units.

In an assembler device 15 the IP data made available by device 14, which data can consist to some extent of non-contiguous fragments, are combined with the protocols and data structures originally present in the Internet. These combined data are stored in a storage device 16 (store Rx).

An access control device 17 (proxy) realizes the access to the service by the user of the Internet service. If the necessary data have already been transmitted via the radio signal and stored in the storage device 16, the Internet information is taken out of the storage unit 16 (indirect transfer). If these data have not been transmitted via the radio signal, the access control device accesses the Internet directly and obtains the necessary data (direct transfer). This connection is established via the mobile radio connection 11 in the direction to and from.

The user can visualize the data in known manner by means of PC or mobile telephone and process them further.

LEGEND

1 Broadcasting system
2 Internet access device
3 Access control device
4 Storage device
5 Provision device (carousel)
6 Interface device
7 Broadcasting transmitter
8 Internet
9 Internet service
10 Internet access instance (service provider)
11 Communication network
12 End terminal
13 Broadcast receiver
14 Interface device
15 Assembler device
16 Storage device
17 Access control device
18 Communication device
19 User This invention claimed is:

1. Method of communicating with the Internet, wherein at least one communication network (11) and one broadcasting system (1) are used for making a connection between an end terminal (12) and the Internet (8), comprising the steps of:
    establishing, via the communication network (11), a bidirectional point-to-point connection between the end terminal (12) and an Internet access service provider (10), by means of which information between the end terminal (12) and the Internet (8) and/or the Internet access service provider (10) are exchanged, and that selected information provided in the Internet can be permanently sent via the broadcast system (1), which can be received by the end terminal (12);
    downloading the selected Internet information from the Internet (8) by the broadcast system (1) and storing such information in a storage device (4);
    cyclically accessing, in the broadcast system (1), a provision device (5), to access the information stored in the storage device (4) and in processed form making it available to a broadcast transmitter (7) for broadcast on the broadcasting system; and
    controlling the function of a provision device (5) in such a way that, via a report back of data requirements, frequently required data are set correspondingly more frequently into the provision device (5), and an access control device (3) evaluates the requirements or required data densities and evaluates and adaptively and dynamically controls how information is set into the provision device (5).

2. Method as claimed in claim 1, wherein available public broadcast systems, such as analog or digital television and audio systems, are employed.

3. Method as claimed in claim 1, wherein the Internet information is transmitted in addition to the broadcast signals proper.

4. Method as claimed in claim 1, wherein via the broadcast system (1) broadcasting frequently requested Internet information or information, access to which is to be completed rapidly.

5. Method as claimed in claim 1, wherein the information broadcast by the broadcast system (1) is selectable and controllable by the users.

6. Method as claimed in claim 1, wherein identifications, address queries, (temporary) passwords and accounting data sets are transmitted via the communication network (11), while large data quantities are transmitted via the broadcast system (1).

7. Method as claimed in claim 1, wherein the Internet information broadcast by the broadcasting system (1) is received in the end terminal (12) and is processed, stored in a storage device (16) and made available to the user.

8. Method as claimed in claim 1, wherein the Internet information requested by the user, which is not stored in the storage device (16), is loaded from the Internet (8) on-line via the communication network (11).

9. system for communication with the Internet, comprising:
- a broadcast system (1) for broadcasting selected information provided in the Internet (8),
- an end terminal (12) with a communication device (18) for the communication with Internet (8) via a communication network (11) and devices (13–16) for receiving and processing the Internet information broadcast by the broadcast system (1), the broadcast system comprising the following units:
- an Internet access and control device (2, 3) in the broadcast system for loading and controlling the information provided in the Internet (8); a storage device (4) for intermediately storing the Internet information; a provision device (5) for the cyclical provision of the Internet information; an interface device (6) for processing the provided Internet information for sending by broadcast transmission, and a broadcast transmitter (7) for sending the processed information;
- a communication device (18) in the end terminal for the connection with an Internet instance (10) via the communication network (11); a broadcast receiver (13) for receiving and for processing the broadcast Internet information; a storage device (16) for the deposition of the Internet information on a receiver storage medium; and an access control device (17) for the random access to the Internet (8) via the communication network (11) and/or the Internet information deposited in the storage device (16): and
- means for controlling the function of a provision device (5) in such a way that, via a report back of data requirements, frequently reciuired data are set correspondingly more frequently into the provision device (5), and the access control device (3) evaluates the requirements or required data densities and evaluates and adaptively and dynamically controls how information is set into the provision device (5).

\* \* \* \* \*